United States Patent [19]

Neal, Jr.

[11] 4,228,474

[45] Oct. 14, 1980

[54] ADAPTER UNIT FOR TRANSLATING ELECTRICAL SIGNALS

[76] Inventor: Roy L. Neal, Jr., RFD 1, Box 56C, Montreal, Mo. 65591

[21] Appl. No.: 959,887

[22] Filed: Nov. 13, 1978

[51] Int. Cl.³ .................. G11B 31/00; G11B 23/00
[52] U.S. Cl. ......................................... 360/137
[58] Field of Search ............... 360/137, 94, 128; 179/100.11, 2 E

[56] References Cited

U.S. PATENT DOCUMENTS

| | | | |
|---|---|---|---|
| 3,700,826 | 10/1972 | O'Neal | 360/137 |
| 3,946,156 | 3/1976 | Budrose | 360/137 |
| 3,978,524 | 8/1976 | Gordon et al. | 360/137 |
| 3,991,369 | 11/1976 | Fujimoto | 179/100.11 |
| 4,034,164 | 7/1977 | Westmoland | 360/137 |

*Primary Examiner*—John H. Wolff
*Attorney, Agent, or Firm*—Charles G. Lamb

[57] ABSTRACT

An adapter unit for translating electrical signals from one signal producing apparatus to a magnetic tape player including means to produce a magnetic field in the vicinity of a magnetic pick-up head of a magnetic tape player when the adapter is inserted into the tape player. The means for producing a magnetic field is in electrical communication with a plug adapted to electrically communicate with the output of the signal producing apparatus.

1 Claim, 1 Drawing Figure

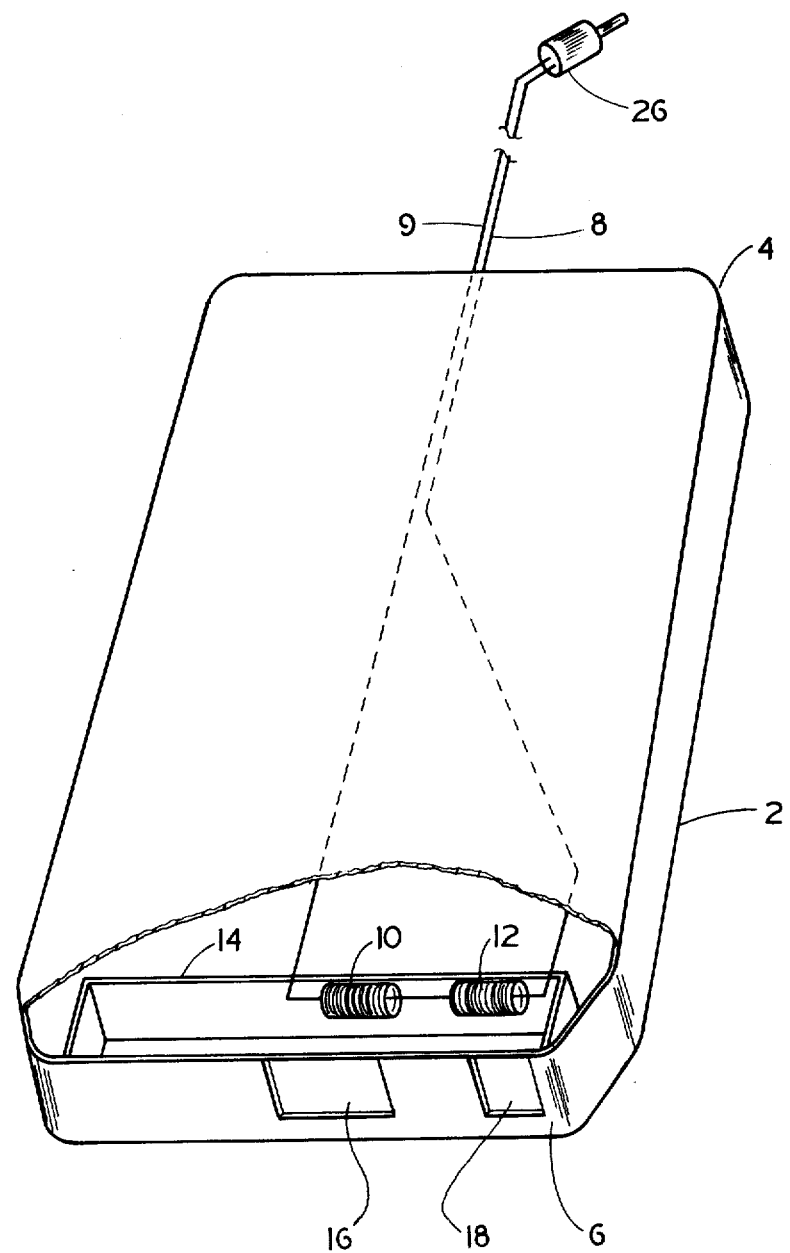

ADAPTER UNIT FOR TRANSLATING ELECTRICAL SIGNALS

BACKGROUND OF THE INVENTION

1. Field of the Invention

This invention relates to an adapter unit for magnetic tape recorders and more particularly relates to an adapter unit for translating electrical signals from a signal producing apparatus to a magnetic tape recorder.

2. Description of the Prior Art

Multi-track tape players, and particularly eight track tape players, have received wide acceptance as a means for providing prerecorded music for homes, theatre, and other entertainment establishments. These tape players have become popular because they are relatively inexpensive and easy to use as, generally, tape cartridges containing the prerecorded music can be inserted with ease therein. Furthermore, the eight track tape player generally provides a relatively high degree of sound fidelity. Thus, because of the ease of use and the high degree of sound reproduction, it is desirable to utilize the electronic circuit of these players to reproduce signals from sources other than the aforementioned tape cartridges. One such adapter is described in U.S. Pat. No. 3,700,826, but the adapter is complex in design and expensive to manufacture.

SUMMARY OF THE INVENTION

In the present invention, it is recognized that it is desirable to provide an adapter unit for magnetic tape players. Furthermore, it is recognized that it is desirable to provide an adapter device whereby electrical signals from one signal producing apparatus can be translated through the output circuitry of a magnetic tape player. Even further, it is recognized that it is desirable to provide an adapter unit for magnetic tape players which is easily constructed, easily and quickly operable, and inexpensive to manufacture.

The present invention advantageously provides a straight-forward arrangement for an adapter unit for magnetic tape players whereby electrical signals from one signal producing apparatus can be translated through the output circuitry of the magnetic tape players. The present invention further provides an adapter unit for magnetic tape players that is inexpensive, sturdy, and easily and quickly operable.

Various other features of the present invention will become obvious to those skilled in the art upon reading the disclosure set forth hereinafter.

More particularly, the present invention provides an adapter unit for translating electrical signals from one signal producing apparatus to a magnetic tape player comprising a housing connecting means extending through the housing to disengageably connect to the output of the one signal producing apparatus; magnetic field producing means disposed within the housing positioned to provide a magnetic field in the vicinity of a magnetic pick-up head of a magnetic tape player when inserted into the magnetic tape player; and, the connecting means and the magnetic field producing means being in electrical communication.

It is to be understood that the description of the example of the present invention given hereinafter is not by way of limitation and various modifications will occur to those skilled in the art upon reading the disclosure set forth hereinafter.

BRIEF DESCRIPTION OF THE DRAWING

The FIGURE is a perspective view, partially cutaway, of a preferred adapter unit of the present invention.

DESCRIPTION OF THE PREFERRED EMBODIMENT

The FIGURE of the drawing shows a structure of a preferred adapter unit of the present invention. The adapter unit includes a housing 2, preferably of a conventional configuration and size to be received by or insertable into a cartridge type multi track tape player. Housing 2 is generally a standard tape cartridge housing without the inclusion of a magnetic tape therein. Housing 2 is provided with opposed end walls 4 and 6, end wall 4 having an opening therein through which electrical connecting leads 8 and 9 pass and end wall 6 includes means to be discussed hereinafter, for communicating with the pick-up of a tape player, not shown.

Disposed within the housing 2 is means for producing a magnetic field in the vicinity of the pick-up of a tape player. The means for producing the magnetic field is a pair of transducers exemplified by choke coils 10 and 12. It is realized that even though two coils are shown, only one is necessary as the choke coil's function is to produce a magnetic field. In a standard eight-track housing, two openings are disposed in the end of the housing where the tape produces a magnetic field. Thus, in using this type of housing, two coils, such as identified by numerals 10 and 12, are preferred. Choke coils 10 and 12 are in series and in electrical communication with leads 8 and 9. Choke coils 10 and 12 are mounted with the housing 2 onto a baffle or partition member 14 by any well known means and are in alignment with openings 16 and 18, respectively in end wall 6. Openings 16 and 18 are positioned for alignment with the magnetic head pick-up of a magnetic tape player (not shown). It is realized that other transducers may be utilized for providing an appropriate magnetic field without departing from the scope and spirit of the present invention.

Connecting leads 8 and 9 are shown as terminating at an ear phone jack plug 26 for receipt by an ear phone jack of a cassette player (not shown). Different kinds and selection of plugs will vary depending upon the signal producing apparatus to which the adapter unit is to be connected. Furthermore, two plugs, or a two circuit plug for transmitting two separate signals, one to each choke coil 10 and 12 to achieve stereophonic translation may also be incorporated in the present invention.

In the use of the adapter unit of the present invention, the adapter unit is inserted into a tape player and the plug 26 is inserted into an earphone jack of a cassette player. Electrical signals are translated from the cassette player to the transducer (10 and 12) through leads 8 and 9 wherein a magnetic field is produced. The transducers or choke coils 10 and 12 are of sufficient size to provide appropriate impedance to establish a magnetic field in the vicinity of the magnetic pick-up head of a multi track, such as an eight track tape player.

It will be realized that various changes may be made to the specific embodiment shown and described without departing from the principles of the present invention.

What is claimed is:

1. An adapter unit for playing remotely located electronic apparatus through a magnetic tape player having a pick-up head, said adapter unit consisting essentially of: a housing; input connecting means extending through said housing to disengageably connect to the output of said remotely located electronic apparatus; at least two stationarily and fixedly mounted magnetic field producing coils in spaced series relation disposed within said housing positioned to provide a magnetic field in the vicinity of said pick-up head of a magnetic tape player, said magnetic field producing coils being spaced from said pick-up head when in operation; and, said connecting means and said magnetic field producing coils being in electrical communication.

* * * * *